(12) United States Patent
Tognetti

(10) Patent No.: US 6,824,757 B2
(45) Date of Patent: Nov. 30, 2004

(54) METHOD AND ARRANGEMENT FOR GENERATING ULTRAPURE STEAM

(75) Inventor: Marcel Tognetti, Dresden (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/389,558

(22) Filed: Mar. 14, 2003

(65) Prior Publication Data

US 2004/0018142 A1 Jan. 29, 2004

(30) Foreign Application Priority Data

Mar. 14, 2002 (DE) .......................................... 102 11 738

(51) Int. Cl.[7] .......................... C01B 5/00; H01L 21/31; F23D 11/44
(52) U.S. Cl. .................... 423/580.1; 431/162; 431/166; 438/773
(58) Field of Search ...................... 423/580.1; 431/162, 431/166, 207; 438/770, 773

(56) References Cited

U.S. PATENT DOCUMENTS

| | | | |
|---|---|---|---|
| 5,235,501 A | 8/1993 | Stuart et al. ................... 363/17 |
| 5,257,926 A | 11/1993 | Drimer et al. ............... 431/154 |
| 5,611,947 A * | 3/1997 | Vavruska ................ 219/121.52 |
| 5,633,212 A | 5/1997 | Yuuki .......................... 438/773 |
| 5,733,114 A | 3/1998 | Peng et al. .................. 431/208 |
| 5,810,929 A | 9/1998 | Yuuki .......................... 118/697 |
| 6,179,609 B1 * | 1/2001 | Drimer et al. ................. 431/11 |
| 6,221,791 B1 | 4/2001 | Wang et al. ................. 438/773 |
| 6,335,295 B1 * | 1/2002 | Patel ........................... 438/773 |
| 6,372,663 B1 * | 4/2002 | Yeh et al. .................... 438/773 |
| 6,410,456 B1 * | 6/2002 | Gronet et al. ............... 438/769 |
| 2003/0045131 A1 * | 3/2003 | Verbeke et al. ............. 438/795 |

* cited by examiner

Primary Examiner—Alexander Ghyka
(74) Attorney, Agent, or Firm—Baker Botts LLP

(57) ABSTRACT

The invention relates to a method for generating ultrapure steam by oxidation of hydrogen in a closed torch with separate feed lines for hydrogen and oxygen and a discharge line for discharging the steam which is formed to a process chamber. The invention also relates to an arrangement for carrying out the method. The invention is intended to provide a method which is simple to implement and an arrangement for generating ultrapure steam which results in a significantly extended injector service life. For this purpose, oxygen and water are fed to the torch in a slightly superstoichiometric ratio, and pure additional oxygen is admixed with the steam formed during the combustion, when it enters the process chamber, in order to generate a considerable excess of oxygen in the steam. The associated device comprises a torch with feed lines for feeding hydrogen and oxygen to the closed torch and a discharge line leading to a process chamber. Each feed line being assigned a mass flow controller. The discharge line leading to a process chamber is connected to an additional oxygen feed line, which is also provided with a mass flow controller.

11 Claims, 2 Drawing Sheets

METHOD AND ARRANGEMENT FOR GENERATING ULTRAPURE STEAM

BACKGROUND OF THE INVENTION

The invention relates to a method for generating ultrapure oxygen bearing steam by oxidation of hydrogen in a closed torch with separate feed lines for hydrogen and oxygen and a discharge line for discharging the steam which is formed to a process chamber. The invention also relates to an apparatus for carrying out the method.

Oxidation processes are carried out in a wide range of process steps involved in the processing of semiconductor wafers for the fabrication of semiconductor components. In this context, it has proven expedient to use steam instead of pure oxygen as the oxidizing agent. However, this steam which is used for oxidation purposes cannot be produced by simply evaporating water, but rather, on account of the extremely high purity requirements, has to be produced by combustion of hydrogen. For this purpose, oxygen and hydrogen have to be provided as ultrapure gases and burned in a special torch. A torch of this type is also known as a balloon.

On one side, a balloon of this type includes an injector for the ultrapure gases which are to be supplied and which are fed to the injector via concentric passages and, on the opposite side, a discharge line is provided for discharging the steam, which is formed during the combustion, to a process chamber. The quantities of hydrogen and oxygen supplied are controlled with the aid of mass flow controllers.

To prevent any contamination, the entire balloon, including the injector and the feed and discharge lines, are made from quartz glass and are welded together. This also ensures that the whole of the interior is hermetically sealed with respect to the environment, so that there is no possibility of contamination by the atmosphere of the environment. Furthermore, the injector is provided with an electrical heater, so that it and the gases passed through it can be preheated to a temperature of >500° C.

At the tip of the injector, the gases which are fed to the injector are mixed with one another and are burned in a flame inside the balloon. Most injectors have been developed for an $H_2:O_2$ mixing ratio of approximately 1:0.65, in order to ensure complete oxidation of the hydrogen. In some applications, the opposite mixing ratio, namely 0.65:1, has proven particularly favourable, resulting in improved oxide uniformity. This means that significantly more oxygen is fed to the injector than would be required for purely stoichiometric combustion. However, this mixture is associated with a considerable increase in the temperature of the flame, with the result that the tip of the injector is "burned off" or devitrified. This leads to a considerable reduction in the service life of the injector. Furthermore, these phenomena may produce particles which cause further problems. Therefore, the entire combustion device becomes unusable and has to be repaired or rebuilt by exchanging the injector.

Exchanging the injector leads to an inevitable shutdown time for the process chamber and therefore reduces production rates.

To lengthen the service life of the injector, it has been attempted to modify its design, but usable results have not been achieved.

The same arrangement is also used to supply small quantities of oxygen (without any combustion process) to process chambers for pre-oxidation purposes by operating the mass flow controllers.

Therefore, the invention is based on the object of providing a process which is simple to implement and an arrangement for generating ultrapure steam which results in significantly lengthened injector service life.

SUMMARY OF INVENTION

The object on which the invention is based is achieved, in a process of the type described in the introduction, through the fact that oxygen and hydrogen are fed to the torch in a slightly superstoichiometric ratio, and that pure additional oxygen is admixed with the steam formed during the combustion, as it enters the process chamber, in order to generate steam having a considerable excess of oxygen.

This method, which is particularly simple to implement, leads to significant lengthening of the injector service life, while supplying the additional oxygen after combustion does not pose any problems. The invention makes it possible to select the quantity of additional oxygen and therefore the proportion of free oxygen in the steam independently, without the service life of the injector or of the balloon being adversely affected.

To avoid any cooling of the steam, with possible formation of condensate at the outlet of the balloon, the additional oxygen which is admixed with the steam may be preheated to a predetermined temperature. The preheating of the additional oxygen may be carried out directly by utilizing the thermal energy of the hydrogen flame.

According to a particularly advantageous configuration of the method, oxygen and hydrogen are fed to the torch in a ratio of 0.65:1, and additional oxygen is admixed with the steam formed during the oxidation process in the torch.

In a further configuration of the invention, the gases which are fed to the torch are preheated; the preheating temperature should be at least 100° C.

Furthermore, the object on which the invention is based is achieved in an apparatus comprising a closed torch with feed lines for feeding hydrogen and oxygen and a discharge line leading to a process chamber. Each feed line is provided with a mass flow controller. An additional oxygen feed line is connected to the discharge line leading to the process chamber and is provided with a mass flow controller.

This allows the oxygen content in the steam which is generated to be set completely independently. The fact that the temperature of the hydrogen flame is not influenced in any way by the supply of the additional oxygen makes it possible to considerably lengthen the service life of the injector and therefore of the entire combustion device. This makes it possible to save considerable operating costs.

To allow sufficient preheating of the additional oxygen, the feed line for the additional oxygen may be provided with a heating device, and the heating device is arranged in the immediate vicinity of the connection of the tube to the discharge passage.

In a particular configuration of the invention, it is provided that the heating device comprises a pipe section of the feed line for the additional oxygen which at least partially surrounds the torch. As a result, the thermal energy of the flame can be used to preheat the additional oxygen.

To rule out any possibility of contamination, all the components of the combustion device, i.e. all the lines and the balloon, consist of quartz glass.

DESCRIPTION OF THE INVENTION

Figure 1:
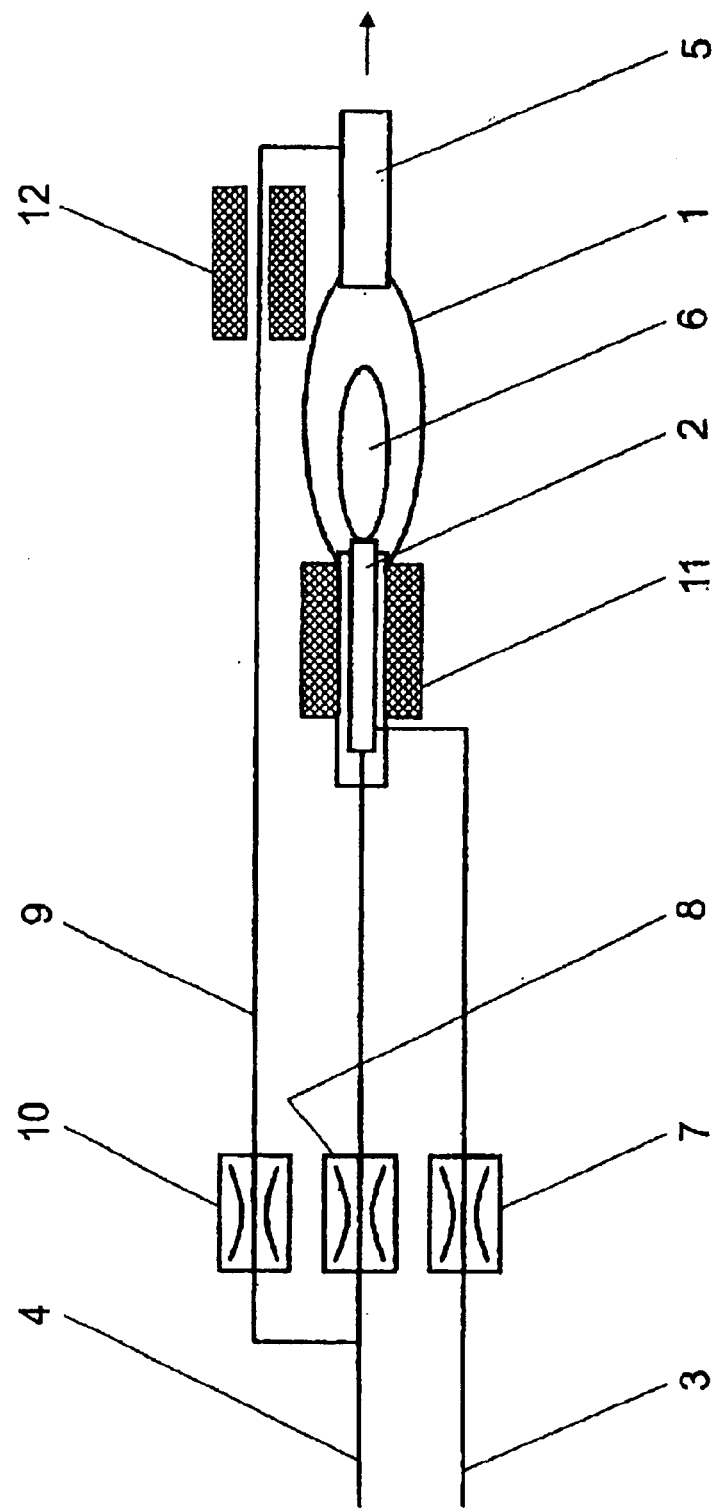
FIG. 1 shows a first embodiment of an apparatus in accordance with the invention.

FIG. 1 illustrates a first apparatus in accordance with the invention which includes a closed torch (balloon) 1, into which on one side an injector 2 projects, which is connected via separate feed lines 3, 4 to a hydrogen source and an oxygen source respectively. On the opposite side of the balloon 1 from the injector 2 there is a discharge line 5, which may be connected to a process chamber (not shown) in which oxidation processes are carried out.

To allow accurate metering of the hydrogen and oxygen which are fed to the injector 2 and are to be burned in a flame 6, there is a mass flow controller 7, 8 in each feed line 3, 4. In normal operation, 0.65 part of oxygen and 1 part of hydrogen are fed to the injector, so that the combustion to form steam takes place in a slightly superstoichiometric ratio. The generation of the desired considerable excess of oxygen in the steam takes place after the combustion as a result of additional oxygen being introduced into the discharge line 5 via a further feed line 9. A mass flow controller 10, which is assigned to the feed line 9, is likewise used to set the precise quantity of additional oxygen.

To ensure a minimum temperature of the flame 6, there is a heating device 11 which surrounds both feed lines 3, 4 outside the balloon 1 directly upstream of the injector.

Figure 2:
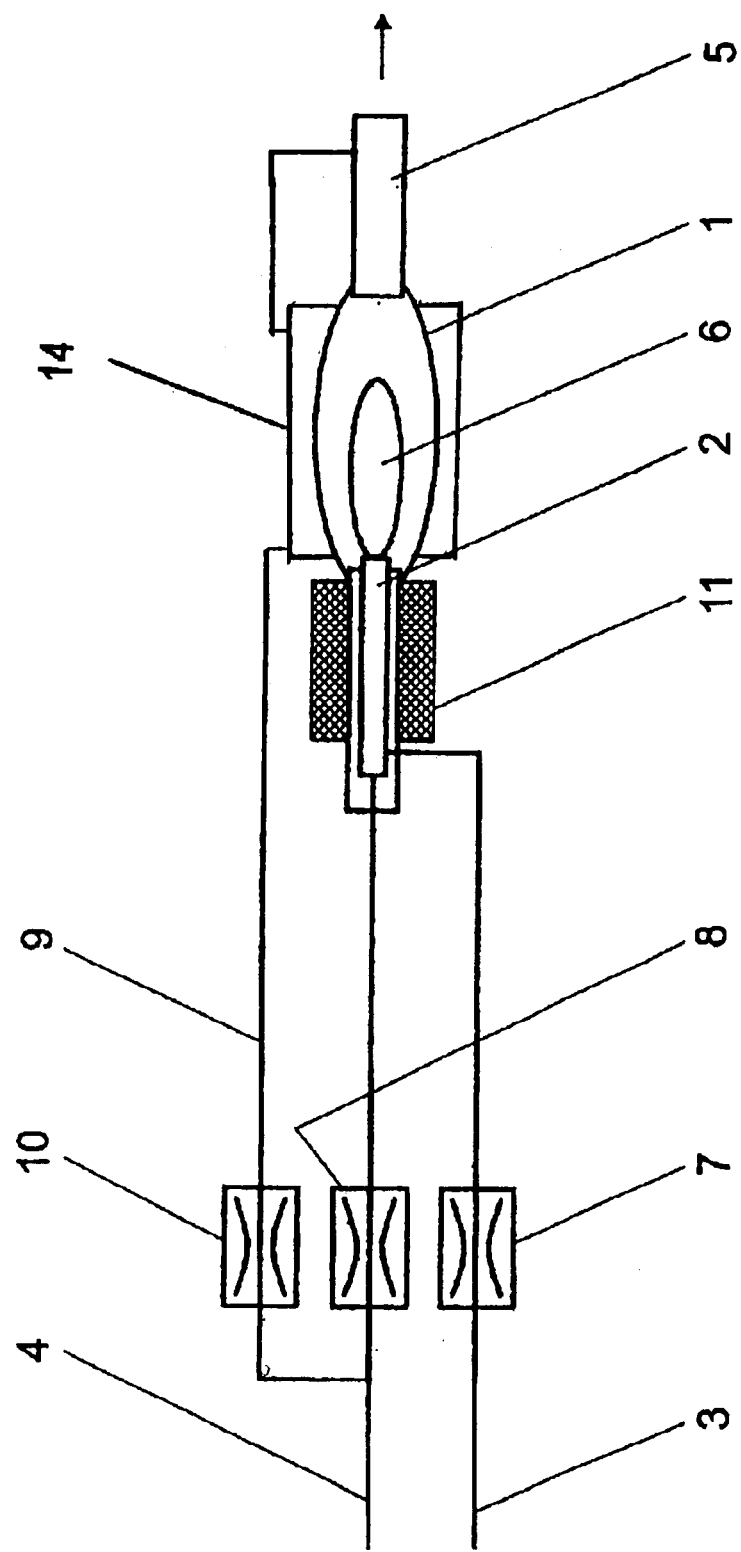
FIG. 2 shows a second embodiment of an apparatus in accordance with the invention.

To ensure that the steam which is generated by the combustion is not cooled unnecessarily, which could lead to undesirable formation of condensate in the discharge line 5, the additional oxygen supplied is preheated by a heating device 12 to approximately the same temperature as the steam. The heating device 12 may be a standard electrical heater or a jacket 14, partially surrounding the torch 1, as shown in FIG. 2, which uses the waste heat from the flame 6.

The apparatus allows the gases fed to the flame 6 to be set completely independently, so that the combustion may take place at a temperature for which the injector 2 is designed, in which case the quantity of additional oxygen in the steam can also be selected independently without this having any effect on the service life of the injector. The fact that combustion always takes place under optimum conditions results in a considerable lengthening of the service life compared to the prior art, which leads to a considerable saving on maintenance outlay and shutdown times. While there have been described what are believed to be the preferred embodiments of the present invention, those skilled in the art will recognize that other and further changes and modifications may be made thereto without department from the spirit of the invention, and it is intended to claim all such changes and modifications that fall within the true scope of the invention.

I claim:

1. Apparatus for providing ultrapure steam having a selected oxygen content for use in a process, comprising:
    a torch having a closed chamber;
    feed lines for feeding hydrogen and oxygen to the closed torch, each feed line having a mass flow controller;
    a discharge line connected to receive steam from said closed torch; and
    an additional feed line having a mass flow controller for providing additional oxygen to said discharge line.

2. Apparatus as specified in claim 1, wherein said additional feed line is provided with a heating device.

3. Apparatus as specified in claim 2, wherein said heating device is arranged near a connection of said additional feed line to said discharge line.

4. Apparatus as specified in claim 3, wherein said heating device comprises a section of said additional feed line which at least partially surrounds said torch.

5. Apparatus as specified in any one of claims 1 to 4, characterized in that all the lines and the torch are fabricated of quartz glass.

6. Apparatus of claim 1, wherein oxygen and hydrogen are fed to the torch in a slightly superstoichiometric ratio, corresponding to less than said selected oxygen content and wherein additional oxygen is admixed with steam formed by combustion in said torch, said admixing being provided in said discharge line, said additional oxygen being admixed in an amount to provide said steam with said selected oxygen content to said process chamber.

7. Apparatus of claim 6, wherein said additional oxygen is preheated before being admixed with said steam.

8. Apparatus of claim 7, wherein said additional oxygen is preheated by utilizing the thermal energy of the hydrogen flame.

9. Apparatus of any one of claims 6–8, wherein oxygen and hydrogen are fed to the torch in a ratio of 0.65:1.

10. Apparatus of claim 1, wherein said oxygen and hydrogen fed to the torch are preheated.

11. Apparatus of claim 10, wherein said oxygen and hydrogen are preheated to a temperature of at least 100 degrees C.

* * * * *